United States Patent [19]

Cerfon

[11] 3,970,476

[45] July 20, 1976

[54] ELECTROCHEMICAL CELL CONTAINING CORROSION INHIBITOR

[75] Inventor: Pierre Cerfon, Freneuse, France

[73] Assignee: Compagnie Industrielle des Piles Electriques "Cipel", Levallois-Perret, France

[22] Filed: June 26, 1975

[21] Appl. No.: 590,711

Related U.S. Application Data

[63] Continuation of Ser. No. 436,095, Jan. 24, 1974, abandoned.

[30] Foreign Application Priority Data

Jan. 30, 1973 France .............................. 73.03235

[52] U.S. Cl. ................................ 136/103; 136/154
[51] Int. Cl.² ........................................ H01M 17/00
[58] Field of Search ........... 136/154, 155, 107, 103, 136/161, 102, 157, 138; 252/387

[56] References Cited

UNITED STATES PATENTS

1,370,056  3/1921  Schulte ........................... 136/103 X
2,399,127  4/1946  Lipinski ............................... 136/103

OTHER PUBLICATIONS

Morehouse et al., Effect of Inhibitors on the Corrosion of Zinc in Dry–Cell Electrolytes, NBS, Reseach Paper RP 1863, vol. 40, Feb. 1948.

Primary Examiner—Anthony Skapars
Attorney, Agent, or Firm—Kenyon & Kenyon Reilly Carr & Chapin

[57] ABSTRACT

An electrochemical cell having a zinc negative electrode, a positive electrode, a saline electrolyte and a corrosion inhibitor added to the saline electrolyte to prevent corrosion of the zinc electrode by the electrolyte is disclosed. The inhibitor is ascorbic acid, which is added to the saline electrolyte preferably in proportions comprised between 700 and 900 mg/l. The mixture of the electrolyte and inhibitor is generally in paste form. The resultant inhibitor-containing electrolyte in practice does not corrode the zinc negative electrode of such cells during storage. Thus, prolonged storage of such cells, even in adverse tropical environments is possible.

3 Claims, No Drawings

ELECTROCHEMICAL CELL CONTAINING CORROSION INHIBITOR

This is a continuation of application Ser. No. 436,095, filed Jan. 24, 1974, now abandoned.

BACKGROUND OF INVENTION

The present invention relates to an electric or electrochemical cell having a zinc negative electrode, a positive electrode and a saline electrolyte containing a corrosion inhibitor to inhibit corrosion of the zinc electrode by the electrolyte.

The problem of the storage of electric cells for a reasonable time arises more particularly under severe climatic conditions, such as heat and dampness conditions in tropical regions. To avoid cell deterioration due to corrosion of the zinc by the electrolyte, it becomes necessary to insert into the electrolyte compartment of dry electric cells of a product that will inhibit the corrosion of zinc by the electrolyte which latter is usually a paste.

In the past, inhibitor products such as petroleum or mineral oils or animal oils have been recommended for such corrosion preventive purposes, as has the use of chromates or chromic acid. Most of these products tested up to the present time either have proved to be ineffective or else found to have a detrimental influence on the discharge of the electric cell.

The present invention makes it possible to overcome the disadvantages of the known art referred to above.

Objects of the present invention are the provision of an electric cell having a zinc negative electrode, a positive electrode and a saline electrolyte, characterized in that the electrolyte contains as the corrosion inhibitor ascorbic acid in a proportion greater than 200 mg/l.

Preferably, the ascorbic acid concentration in the saline electrolyte is comprised between 700 and 900 mg/l.

Other objects and features of the present invention are the provision of electric so-called dry cells containing a corrosion inhibitor which renders it possible to store such cells for long periods in adverse environments such as those of heat and dampness as may be encountered in tropical regions by inhibiting attack on and perforation of the zinc electrode by the electrolyte.

Further objects and features of the invention will become apparent from the following detailed description.

DETAILED DESCRIPTION

An electric cell embodying the invention by way of an example is as follows:

The structure of an electric dry cell of cylindrical type extant comprises a depolarizing mixture based on manganese dioxide, a zinc can constituting the negative electrode, a paste electrolyte, and a positive electrode. The structural technique of electric dry cells of this type is described generally, for example, in the book by George Wood Vinal, entitled PRIMARY BATTERIES at pages 45 and 46 (published by Wiley, New York, N.Y. 1950).

In connection with such cell structure novel electrolyte according to the invention is used in place of known or conventional electrolytes.

The novel electrolyte embodying the invention has the following proportionate composition:

| | |
|---|---|
| Potato starch | 176 grams |
| 50% zinc chloride solution | 100 cc |
| Saturated ammonium chloride solution | 400 cc |
| Ascorbic acid (vitamin C) | 0.5 grams |

The ascorbic acid in this electrolyte serves as corrosion inhibitor to inhibit corrosion of the zinc electrode by the electrolyte.

In this novel electrolyte composition, the concentration of ascorbic acid is 800 mg/l. This electrolyte is in the form of a paste.

When electrolyte of this composition is introduced into cells of the type herein described in place of similar electrolytes lacking only the ascorbic acid it is observed surprisingly that the addition of the ascorbic acid clearly and materially reduces the corrosion by the electrolyte of the negative zinc electrode during cell storage.

Storage test procedures comparing cells embodying the novel electrolyte with like structural cells whose electrolyte did not include ascorbic acid were made.

Two series of these comparative storage tests were undertaken (1) at ambient or room temperature and (2) in an oven maintained at 45°C.

Electric cells subjected to the first of these tests with the aforesaid ascorbic acid content in the electrolyte stored at room or ambient temperature did not have any perforation in the zinc can electrode even at the end of four years of storage and their performances were found to be only slightly decreased. However, with similar reference electric cells stored at the same temperature in the same environment and whose electrolyte did not include the ascorbic acid, the first perforations in the zinc can appeared after nine months.

The second series of comparative tests were conducted in an even maintained at 45°. Cells whose electrolyte included ascorbic acid according to this invention and reference cells lacking ascorbic acid in the electrolyte were stored in the oven over a period of three months. At the end of that time, none of the electric cells according to the invention had any perforations in their zinc cans whereas in the reference electric cells lacking ascorbic acid perforations in the zinc cans began to appear after two months time.

It is clear, therefore, from the results of the two series of comparative tests that in cells containing the ascorbic acid inhibitor as herein described, corrosion by the electrolyte of the zinc cans or electrodes of the cells is inhibited both at ambient or normal room temperatures and also at higher temperatures and other adverse conditions likely to exist in tropical surroundings. The provision in cells of electrolyte including the inhibitor herein described thus effectively and materially extends the storage life of the cells under all temperature conditions likely to be encountered as compared with the lives of similar cells lacking said inhibitor in their electrolyte.

It must be understood that the electrolyte containing an inhibitor according to the invention may be used in all electric cells having a saline electrolyte, whatever their shape may be, for example in electric batteries having flat cells.

It is to be understood further that other starches and gelling agents known in the art may be used in place of potato starch in the preparation of the inhibitor-containing electrolyte of this invention.

While specific embodiments of the invention have been disclosed, variations within the scope of the appended claims are possible and are contemplated. There is no intention, therefore, of limitation to the exact disclosure herein presented.

What is claimed is:

1. An electric cell comprising a zinc negative electrode, a manganese dioxide positive electrode and saline electrolyte, said electrolyte comprising a mixture of starch, zinc chloride solution, ammonium chloride solution and ascorbic acid, said ascorbic acid serving as a corrosion inhibitor, and wherein said ascorbic acid is present in said mixture in a concentration ranging from 700–900 mg/l.

2. An electric cell according to claim 1 wherein said mixture comprises proportionately approximately 175 grams of potato starch, 100 cc of 50% zinc chloride solution, 400 cc of saturated ammonium chloride solution and 0.5 grams of ascorbic acid.

3. An electric cell according to claim 1 wherein the concentration of said ascorbic acid is approximately 800/mg/l of electrolyte.

* * * * *